United States Patent [19]

Aoki

[11] 4,101,618

[45] Jul. 18, 1978

[54] INJECTION BLOW MOLDING METHOD FOR HOLLOW ARTICLE HAVING OPENINGS AT BOTH ENDS

[75] Inventor: Katashi Aoki, Sakaki, Japan

[73] Assignee: Nissei Plastics Industrial Co., Ltd., Japan

[21] Appl. No.: 420,231

[22] Filed: Nov. 29, 1973

[30] Foreign Application Priority Data

Dec. 4, 1972 [JP] Japan .................................. 47-121385

[51] Int. Cl.² ............................................ B29C 17/07
[52] U.S. Cl. ...................................... 264/97; 264/161; 264/163; 425/527; 425/533
[58] Field of Search .................. 264/89, 90, 92, 94, 264/97, 296, 161, 163; 425/242 B, 387 B, DIG. 209, DIG. 214, 324 B; 65/79, 80

[56] References Cited

U.S. PATENT DOCUMENTS

| | | | |
|---|---|---|---|
| 598,224 | 2/1898 | Hays | 425/DIG. 214 |
| 1,127,381 | 2/1915 | Byrnes | 425/DIG. 214 |

Primary Examiner—Jan H. Silbaugh
Attorney, Agent, or Firm—Weingarten, Maxham & Schurgin

[57] ABSTRACT

Injection blow molding method for a hollow article having openings at both ends, in which said method comprises the steps of: forming a parison having openings at both ends by injecting plastic material into the cavity of an injection mold which is provided with a stationary core member and a movable core member as disposed on the same axis, shifting said parison from said injection mold to said blow mold together with a movable core member, closing the remaining open end of said parison by a closing core member, and blowing said parison within said blow mold to produce a molded article having openings at both ends.

1 Claim, 7 Drawing Figures

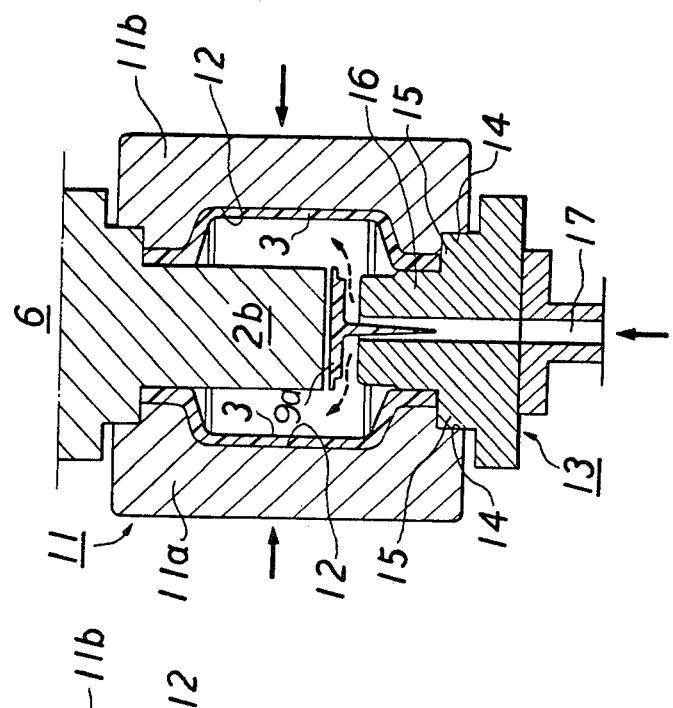
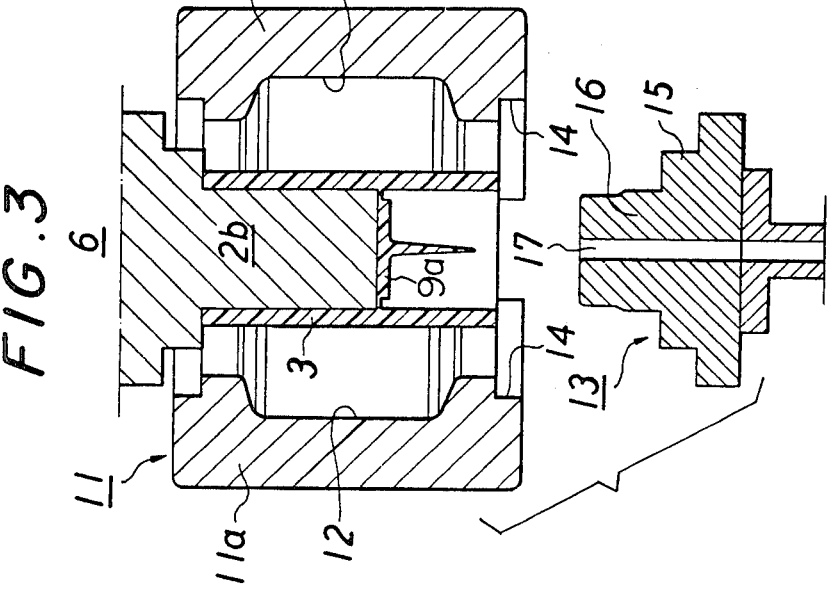

INJECTION BLOW MOLDING METHOD FOR HOLLOW ARTICLE HAVING OPENINGS AT BOTH ENDS

BACKGROUND OF THE INVENTION

This invention relates to an injection blow molding of an article having openings at both ends. More particularly, this invention relates to a new and improved method for injection blow molding in which a parison having two open ends is made by injection molding, thereafter, said parison is blown to form a molded article having two openings at both ends.

In the conventional injection blow molding, a bottomed parison is formed by injecting plastic material into a cavity of an injection mold with a core member. Then, the bottomed parison is transferred to a blow molding station with said core member and blowing operation is carried out to form a blow molded article such as a bottomed bottle.

Accordingly, the prior art of the injection blow molding has been suitable for manufacturing containers having bottoms such as bottles, cups and so forth. It has been, however, impossible or almost impossible to form a plastic article having openings at both ends without a bottom such as bellows, lamp chimneys, etc.

BRIEF SUMMARY OF THE INVENTION

The object of the present invention is to propose a new and improved method for injection blow molding.

Further object of the present invention is to propose the method for injection blow molding for manufacturing a hollow plastic article having openings at both ends.

Still further object of the present invention is to propose the method for injection blow molding in which said hollow -plastic article having openings at both ends can be made without any difficulty as compared with the conventional injection blow molding method.

Pursuant to the above objects, particularly improved core members which are different from the conventional ones in the structure and effect are employed in the present invention.

That is, the injection blow molding method of the present invention comprises the steps of: forming a parison having openings at both ends by injecting plastic material into the cavity of an injection mold which is provided with a stationary core member and a movable core member as disposed on the same axis; shifting said parison from said injection mold to a blow mold together with said movable core member; closing the remaining open end of said parison by a closing core member; and blowing said parison within said blow mold to produce a molded article having openings at both ends.

Further, the apparatus employed in the present invention comprises an injection mold which is provided with a stationary core member and a movable core member as disposed on the same axis, said movable core member being reciprocally moved for drawing out the injection molded parison from the injection mold; a blow mold which is provided with a closing core member to close the open end of the parison as shifted from the injection mold; and a shifting device to shift the injection molded parison together with said movable core member from the injection mold to said blow mold.

BRIEF DESCRIPTION OF THE DRAWINGS

These and other objects and features of the present invention will be further described with regard to an embodiment of the invention with reference to the accompanying drawings, in which:

FIG. 3 is a cross-sectional view of the blow mold of the present invention;

FIG. 4 is a cross-sectional view of the blow mold in which the parison is blown;

DETAILED DESCRIPTION OF THE INVENTION

Figure 1:
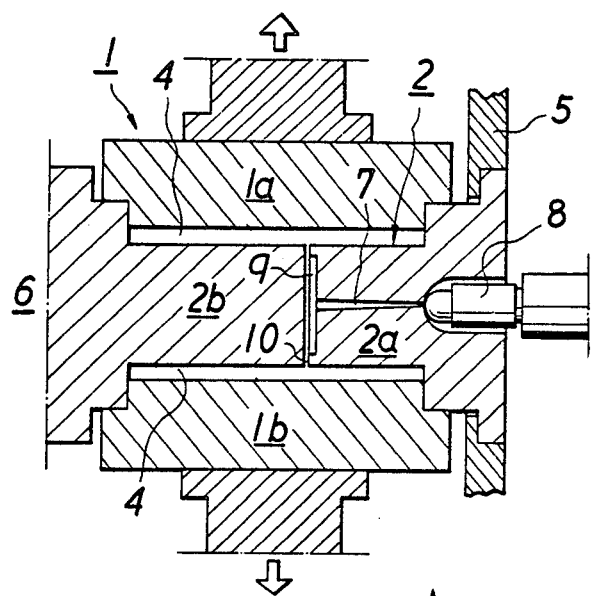
FIG. 1 is a cross-sectional view of the injection mold of the present invention.

Referring now to the drawings, there is shown an injection mold 1 which comprises a pair of separable mold members 1a and 1b, and said mold members can be moved to the directions as indicated by arrows. Said mold 1 is provided with a core 2 on its axis to form a cavity 4 for forming a parison 3 having two open ends.

Said core 2 comprises a stationary core member 2a and a movable core member 2b, where the former core member 2a is attached to a stationary plate 5 and projected into the middle portion of said injection mold 1, and the latter core member 2b is attached to a hydraulic shifting device 6 and moved on the same axis line reciprocally between the below-mentioned blow mold.

In this embodiment, a sprue 7 is formed at the center of the stationary core member 2a and a nozzle 8 is contacted to one end of said sprue 7. Further, one side surface of said stationary core member 2a is provided with a depression, thus runners 9 and film gates 10 are formed in the end surface of said movable core member 2b. The positions of said gates and runners, however, are not restricted to this embodiment, and they may be determined and formed according to each practical operation.

The numeral 11 in FIG. 3 is a blow mold which comprises blow mold members 11a and 11b, and a closing member 13, thus a cavity 12 is formed. Said mold members 11a and 11b can be moved to separate in the horizontal direction, and said closing member 13 can be moved in the vertical direction.

Said closing member 13 comprises a pedestal portion 15 which is fitted into the stepped portions 14 formed at the lowermost ends of said mold members 11a and 11b, and a closing core 16 which projects from the upper surface of said pedestal portion 15. Further, an air passage 17 is formed through the center of said closing member 13. The external diameter of said closing core 16 is the same as the inner diameter of the afore-mentioned parison 3, and the open end of the parison extended from the periphery of said movable core 2b is hermetically closed by said closing core 16 when fitting to the stepped portions 14.

Figure 5:
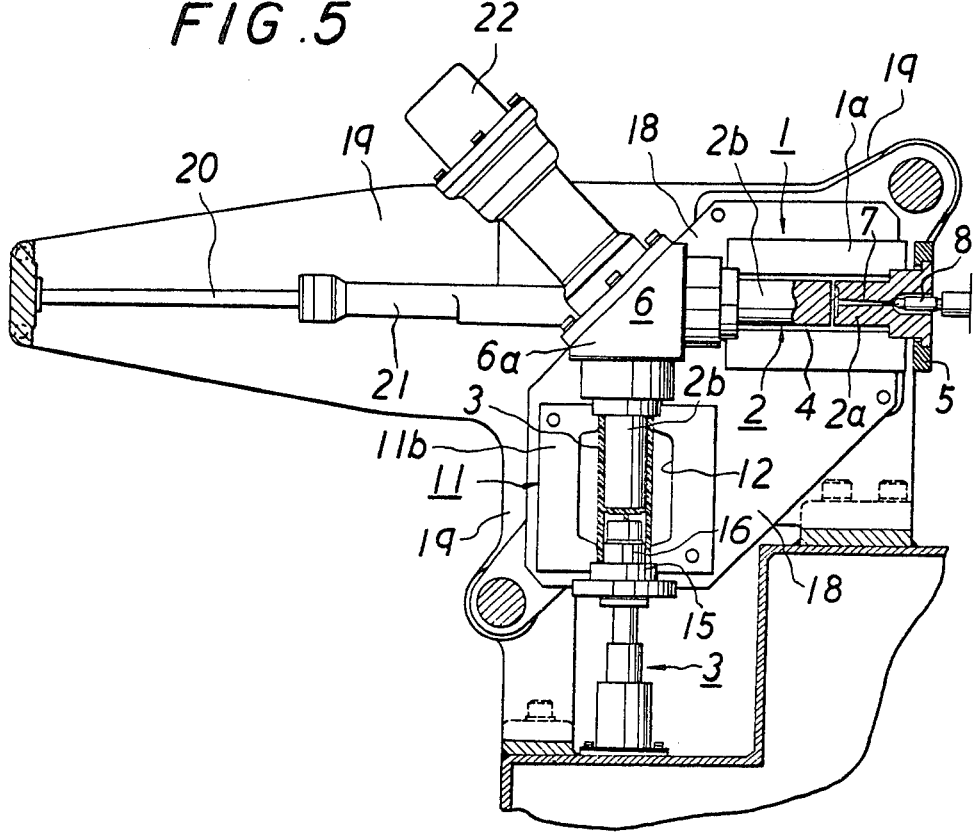
FIG. 5 is a cross-sectional front view of the apparatus of the injection blow molding of the present invention.

In FIG. 5, the relative positions of the above-mentioned injection mold 1, blow mold 11 and core members are shown, in which the afore-mentioned shifting device 6 with the movable core member 2b is positioned at the intersection of the injection mold 1 which is horizontally installed on the mold clamping plate 18 and the blow mold 11 which is vertically installed on the lower portion of said mold clamping plate 18. Further, said shifting device 6 is provided with a hydraulic cylinder 21 to move a guide rod 20 attached to the frame 19 and a 180° rotational hydraulic motor 22 which is attached to the back side of a core fitting block 6a.

The method of the present invention which is carried out by using the above-described embodiment will be explained in the following.

In the first place, the parison 3 having openings at both ends is molded by using the injection mold 1. More particularly, the stationary core member 2a and movable core member 2b are aligned on the same axis, then the mold members 1a and 1b are closed and clamped to form the cavity 4. Then plastic material is injected into said cavity 4 through the film gate 10. (See FIG. 1).

Figure 2:
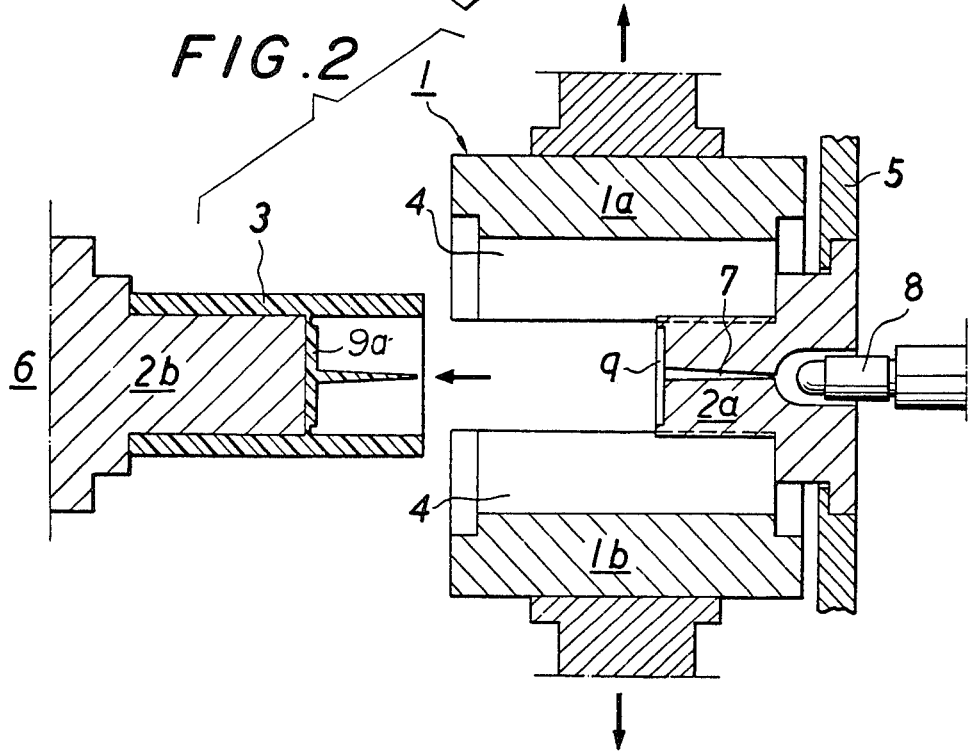
FIG. 2 is a cross-sectional view of the injection mold in which the molded parison is drawn out from the mold.

After the molding of said parison 3, the mold members 1a and 1b are opened, and the shifting device 6 is horizontally moved together with the movable core member 2b by the force of the hydraulic cylinder 21, thereby the parison 3 is drawn out from the stationary core member 2a. (See FIG. 2)

The parison 3 released from the injection mold 1 is shifted to the blow mold 11 by the hydraulic motor together with the movable core member 2b which rotates 180°, and is positioned vertically between the opened blow mold members 11a and 11b. (See FIG. 3)

After the parison is shifted to the blow mold, the aforementioned closing member 16 is hydraulically raised and inserted into the lower opening of the parison suspended from the movable core member 2b. Then, the above-mentioned mold members 11a and 11b are advanced and closed to form a closed blow mold 11, where the upper periphery of the parison 3 is hermetically held by the movable core member 2b and the inner surface of the blow mold 11, and the lower end of the parison by the closing core 16 and the inner surface of the blow mold 11. Thereafter, the air is blown from the air passage 17 of the closing core 16 to expand the parison 3 in the cavity. In this step, the portions of the runner 9a and so forth are plucked off from the inside surface of the parison 3 when it is expanded. (See FIG. 4)

The blow moled article 23 produced through the above-mentioned steps is released from the blow mold 11 with the movable core member 2b when the shifting device 6 is again rotated to the horizontal position, and after that, the molded article is drawn out from the movable core member 2b.

Figure 6A:
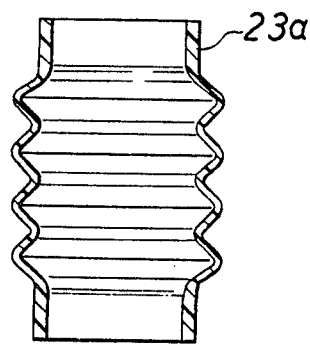
FIG. 6 (A) and FIG. 6 (B) are cross-sectional views of the molded products according to the present invention.
Figure 6B:
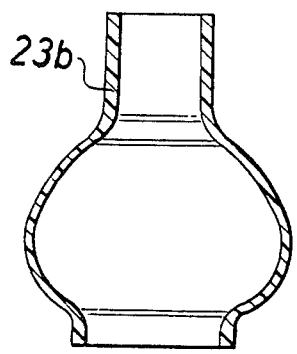

In the above embodiment, the middle portion of the parison 3 is blown uniformly, however, when the inside of the cavity 12 of the blow mold 11 is provided with wave-like surface, the belows 23a as shown in FIG. 6 (A) is formed. Further, it is possible to form a molded article having openings which are different in diameters such as the lamp chimney 23b as shown in FIG. 6 (B) or a globe having two openings for a desk lamp. Further, though it is not shown in the drawings, the blow molded article which has screw threads on the out side of the open end may be produced by the method of the present invention.

In addition to that, the process of the present invention is not so much different from the process of the injection blow of bottomed parisons, and the steps from the molding to the blowing of the parison may be carried out in continuous manner. Therefore, the workability, productivity and the utility of the present invention are far excellent as compared with the ordinary blow molding method.

What is claimed is:

1. An injection blow molding method for making a hollow article being open from end-to-end, by means of a molding machine having at least two laterally displaceable injection mold members, a stationary core member and a movable core member, at least two laterally displaceable blow mold members and a closing core member, said movable core being longitudinally displaceable and movable between said injection mold and said blow mold, said method comprising the steps of:

axially aligning said movable core to a position in closely adjacent relationship with said stationary core;

forming an injection mold cavity by laterally moving said injection mold members into engagement with said movable and stationary core members;

injecting plasticized material into said cavity to form a parison, said parison including runners between the internal wall surfaces thereof;

laterally displacing said injection mold members from the parison thus formed;

axially withdrawing said movable core member and said parison thereon from the vicinity of said stationary core member, a first end of said parison being sealed by said movable core;

displacing said movable core and parison to said blow mold;

axially aligning said movable core member with said closing core member;

sealing the second end of said parison by means of said closing core member;

laterally displacing said blow mold members toward said parison to form a blow mold cavity, the ends of said parison being hermetically sealed by being tightly engaged between the inner surfaces of said blow mold members and said movable core and said closing core member;

centrally holding said runners; while blowing said parison within said blow mold cavity to laterally separate said parison walls from said runners thereby forming said hollow article; and removing said completed article from said molding machine.

* * * * *